United States Patent
Koprubasi et al.

(10) Patent No.: US 8,355,833 B2
(45) Date of Patent: Jan. 15, 2013

(54) SYSTEMS AND METHODS FOR CONTROLLING ENGINE TORQUE

(75) Inventors: Kerem Koprubasi, Birmingham, MI (US); William L. Aldrich, III, Davisburg, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 243 days.

(21) Appl. No.: 12/958,981

(22) Filed: Dec. 2, 2010

(65) Prior Publication Data

US 2012/0143411 A1    Jun. 7, 2012

(51) Int. Cl.
- B60L 9/00 (2006.01)
- B60L 11/00 (2006.01)
- G05D 1/00 (2006.01)
- G05D 3/00 (2006.01)
- G06F 7/00 (2006.01)
- G06F 17/00 (2006.01)

(52) U.S. Cl. ......... 701/22; 701/99; 701/102; 180/65.22; 180/65.265; 180/65.275; 903/902; 903/904; 903/915

(58) Field of Classification Search .............. 701/22, 701/69, 99, 101, 102; 180/65.1–65.8; 903/902–907, 903/915, 930

See application file for complete search history.

(56) References Cited

U.S. PATENT DOCUMENTS

| 7,290,525 | B1 | 11/2007 | Kapsokavathis et al. | |
|---|---|---|---|---|
| 7,305,965 | B2 | 12/2007 | Zillmer et al. | |
| 2009/0093336 | A1* | 4/2009 | Soliman et al. | 477/5 |
| 2009/0143188 | A1* | 6/2009 | Soliman et al. | 477/5 |
| 2010/0125020 | A1* | 5/2010 | Ikegami et al. | 477/3 |

* cited by examiner

*Primary Examiner* — Hussein Elchanti
*Assistant Examiner* — Rami Khatib
(74) *Attorney, Agent, or Firm* — Parks IP Law LLC; Mickki D. Murray

(57) ABSTRACT

A vehicular system including an electrical sub-system, an engine generating a first torque to drive a crankshaft, an electric machine applying a second torque to the crankshaft, and a mechanical accessory sub-system applying a third torque to the crankshaft. The vehicular system also includes a control sub-system having a processor and a tangible, non-transitory computer-readable medium, storing instructions that, when executed by the processor, cause the processor to (i) during idle operation of the vehicle, select a mode operation, of a plurality of system modes including a charge mode and a discharge mode, to stabilize a net torque being a sum of the first, second, and third torques, and (ii) control operation of at least one of the electric machine and the engine according to the selected mode.

20 Claims, 3 Drawing Sheets

SYSTEMS AND METHODS FOR CONTROLLING ENGINE TORQUE

TECHNICAL FIELD

The technical field is generally systems and methods for controlling engine torque, including responding to loads on the engine.

BACKGROUND

During idle operation of a vehicle, loads may be intermittently and quickly applied to the vehicle's power system and draw from power supplied by the internal combustion engine. Loads include various electrical loads, mechanical loads, and those caused by environmental conditions. For example, loads are applied when the vehicle accelerates from idle (such when the vehicle accelerates from being stopped or from a constant speed), when an air conditioning compressor coupled to the engine is enabled or when an alternator responds to an increase in electrical power usage. During idle operation, the engine alone needs a relatively constant specific amount of energy to run the engine (e.g., to compensate for heat loss and frictional loss) and maintain a constant idle speed. However, to compensate for intermittent loads applied to the engine while maintaining constant idle speed operation, different approaches have been developed.

One approach is to control airflow into the engine with the throttle. However, the throttle provides a torque response that is often too slow to meet the demands of intermittently applied loads. Another approach is to control spark timing. Spark timing is measured with respect to crankshaft rotation for a spark ignited internal combustion engine, with Top Dead Center (TDC) of the piston compression stoke being considered 0 degrees. Advancing spark refers to igniting the spark device earlier in the piston rotation cycle. Retarding spark refers to igniting the spark later in the rotation cycle.

Ideally the spark timing commanded during idle operation is the spark advance that provides maximum brake torque timing (referred to as MBT timing). This provides the highest energy output of the engine for the given operating conditions and the amount of fuel used. Retarding spark timing from MBT timing reduces the power output from the engine. This has the effect of reducing the efficiency of the engine and requires more airflow and fuel to provide a given torque; but, it also has the effect of creating a torque reserve that can be used to meet the demands of quickly increasing loads on the engine via spark control by advancing spark on the next combustion cycle. However, as provided, retarding spark timing results in increased fuel consumption and a concomitant reduction in fuel economy.

In vehicles such as hybrid vehicles, one or more electric machine may work in conjunction with the internal combustion engine and may be used to respond to intermittent load demands. The electric machine can respond much more quickly to torque commands than throttle generated torque commands for the internal combustion engine. Consequently, the electric machine represents a torque actuator that may be used in place of spark retard generated torque reserve. Additionally, when a load is removed from the engine and less torque is required, the electric machine can quickly provide negative torque that can be used to charge an electrical energy storage device. This operation removes the necessity to even further retard spark for decreasing torque requests.

The electric machine may be powered by batteries or other electric energy sources (such as supercaps or fuel cells) and also has the ability to generate and store electrical energy. When the electric machine draws electrical energy, it provides positive torque, when the electrical machine generates and stores electrical energy, it provides negative torque.

SUMMARY

The various embodiments provide an engine control system configured to provide idle torque reserve, to reduce spark retard losses during engine idle, to improve combustion stability at idle, to significantly lower or eliminate battery voltage fluctuations on an LV bus, and problems associated therewith.

In one embodiment, the disclosure refers to a vehicular system including a crankshaft and an internal combustion engine connected to the crankshaft, and generating a first, engine torque $T_1$ to drive the crankshaft. The vehicular system further includes an electric machine coupled to the crankshaft, and applying a second torque $T_2$ to the crankshaft and a mechanical accessory sub-system, including at least one mechanical accessory, coupled to the crankshaft, and applying a third, accessory torque $T_3$ to the crankshaft. The vehicular system also includes a control sub-system having a processor and a tangible, non-transitory computer-readable medium, storing instructions that, when executed by the processor, cause the processor to (i) during idle operation of the vehicle, select a mode operation, of a plurality of system modes including a charge mode and a discharge mode, to stabilize a net torque $T_4$ being a sum of the first, second, and third torques ($T_4=T_1+T_2+T_3$), and (ii) control operation of at least one of the electric machine and the engine according to the selected mode, thereby limiting voltage fluctuations in the electrical sub-system (e.g., on an LV bus).

In another embodiment, the disclosure refers to a method implemented by a computerized system of a vehicle having a crankshaft, an internal combustion engine connected to the crankshaft, and generating a first, engine torque $T_1$ to drive the crankshaft, an electric machine coupled to the crankshaft, and applying a second torque $T_2$ to the crankshaft, and a mechanical accessory sub-system coupled to the crankshaft, and applying a third, accessory torque $T_3$ to the crankshaft. The method includes, (1) during idle operation of the vehicle, selecting a mode operation, of a plurality of system modes including a charge mode and a discharge mode, to stabilize a net torque $T_4$ being a sum of the first, second, and third torques ($T_4=T_1+T_2+T_3$) and (2) controlling operation of at least one of the electric machine and the engine according to the selected mode, thereby limiting voltage fluctuations in the electrical sub-system (e.g., fluctuations on the LV bus).

In one embodiment, the disclosure relates to a tangible, non-transitory computer-readable medium storing instructions that, when executed by a computer processor, cause the processor to perform a method for controlling select operations of a vehicle having an electrical sub-system, a crankshaft, an internal combustion engine connected to the crankshaft, and generating a first, engine torque $T_1$ to drive the crankshaft, an electric machine coupled to the crankshaft, and applying a second torque $T_2$ to the crankshaft, and a mechanical accessory sub-system coupled to the crankshaft, and applying a third, accessory torque $T_3$ to the crankshaft. The includes (a) during idle operation of the vehicle, selecting a mode of operation, of a plurality of system modes including a charge mode and a discharge mode, to stabilize a net torque $T_4$ being a sum of the first, second, and third torques ($T_4=T_1+T_2+T_3$), and (b) controlling operation of at least one of the electric machine and the engine according to the selected mode, thereby limiting voltage fluctuations in the electrical sub-system (e.g., fluctuations on the LV bus).

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Idle Operation

Exemplary embodiments of a vehicle are described in the context of idle operation. Generally, idle operation occurs when loads of the internal combustion engine are limited to auxiliary system loads and internal engine losses, such as when the vehicle is stopped. Generally, during idle operation, the driver is not requesting any operation that would result in changes of engine speed. Idle operation could also include any operating mode in which it is necessary to maintain a torque reserve via spark retard to meet the torque demand requirements for intermittent loads while maintaining smooth engine operation.

Loads

Systems and methods described herein are configured to respond to loads that are intermittently and quickly applied to the vehicle's power system (e.g., engine) during idle operation of the vehicle. Such loads include mechanical loads, electrical loads, loads due to environmental conditions, and the like. For example, load changes occur whenever mechanical devices directly coupled to the rotational output of the internal combustion engine change their torque demands. Examples of such mechanical devices are: air conditioning compressors, alternators, pumps, etc. Additionally, the vehicle transmission represents a load on the engine even at idle. Manual transmission loads, when the clutch is disengaged, provide additional frictional drag. Automatic transmission loads include frictional drag, but also include additional, varying loads required to drive the hydraulic pump in the transmission.

Figure 1:
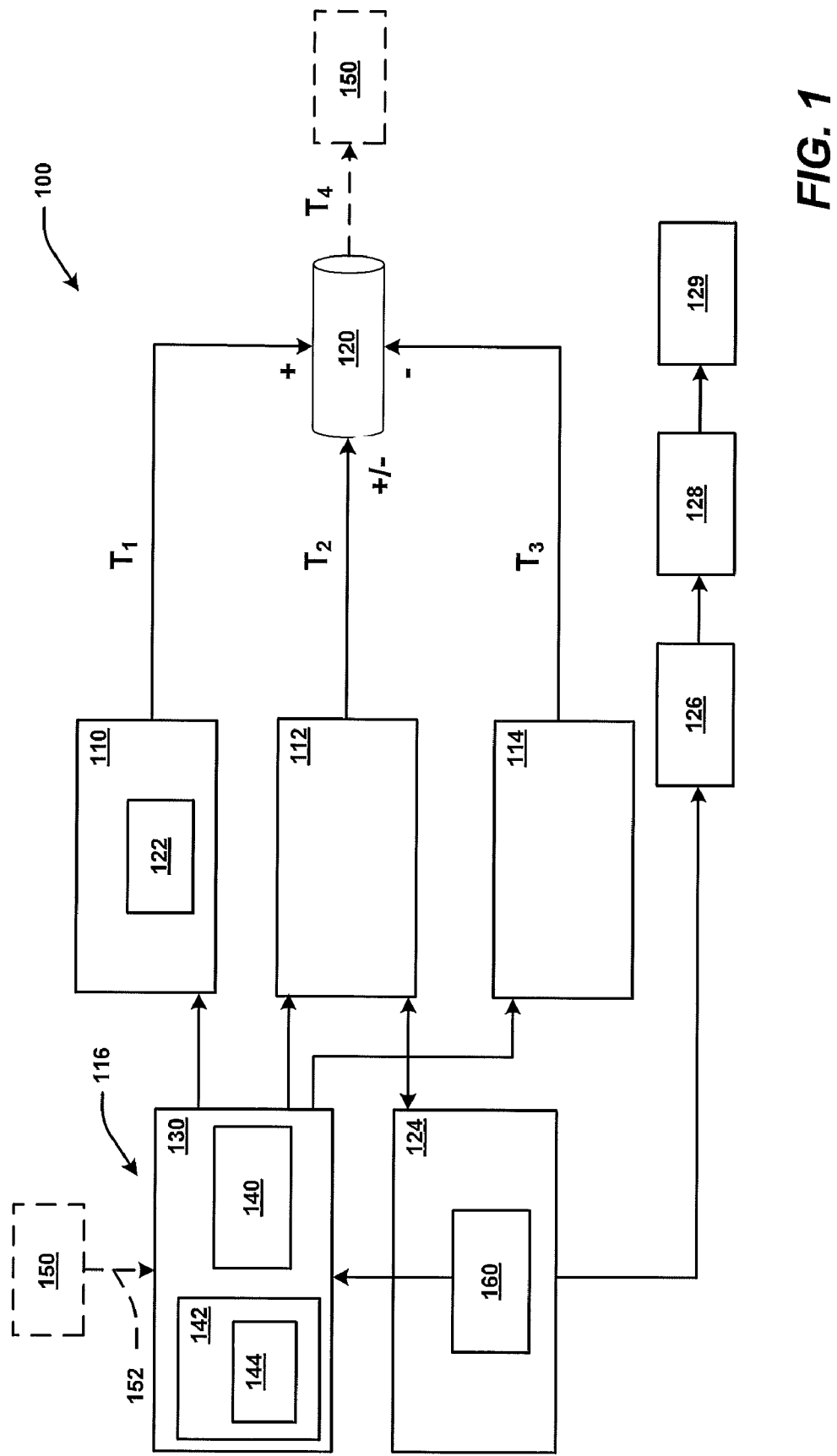
FIG. 1 is a schematic illustration of vehicle with a system configured to respond to loads, according to an exemplary embodiment.

Referring to FIG. 1, a vehicle 100 includes an internal combustion engine 110, an electric machine 112, other mechanical accessory systems 114, and a control system 116. The electric machine 112 may be an electric motor and/or generator, and in one embodiment is preferably the combined electric motor/generator.

The engine 110 drives a crankshaft 120, and the electric machine 112 and the mechanical accessory systems 114 are coupled to the crankshaft 120. In certain embodiments, the electric machine 112 is selectively coupled to the engine 110. For example, the electric machine can be connected via a clutch, a belt drive, or a gear drive.

The engine 110 includes a throttle 122 that controls airflow to the engine 110 and a spark control (not shown in detail) that controls spark timing. The throttle 122 and the spark control are electronically controlled by the control system 116. The engine 110 generates an engine torque $T_1$, which is applied to the crankshaft 120 as a function of the amount of air that enters the engine 110 and a setting of the spark timing. The spark timing can be advanced or retarded to change engine torque $T_1$. However, the control system 116 generally maintains the spark timing generally at about MBT timing to optimize fuel efficiency.

The electric machine 112 is configured to apply a torque $T_2$ (positive, negative, or zero) to the crankshaft 120. The electric machine 112 applies a negative torque $T_2$ to use power generated by the engine 110 or applies a positive torque $T_2$ to add to power output by the engine 110. As described further below, during idle operation, engine torque $T_1$ and torque $T_2$ are controlled to stabilize a net torque. As such, the electric machine 112 is configured to support the idling operation of the internal combustion engine 110.

The mechanical accessory systems 114 are configured to apply an accessory torque $T_3$ to the crankshaft 120. The mechanical accessory systems 114 apply no accessory torque $T_3$ or apply negative accessory torque $T_3$ to use power generated by the engine 110. Exemplary accessory systems include transmissions (e.g., with respect to spin loss), steering systems, brake systems, heating, ventilating, and air conditioning (HVAC) systems, other mechanical systems, combinations thereof, and the like.

Referring to FIGS. 1-5, the sum of the engine torque $T_1$, the torque $T_2$, and the accessory torque $T_3$ is referred to as a net torque $T_4$. In general, the net torque $T_4$ is sufficient to overcome friction (e.g., friction in the engine and/or other parts of the system associated with the engine 110 in the vehicle 100) during idle operation and maintain a desired idle speed.

Continuing with FIG. 1, the vehicle 100 further includes a high-voltage (HV) battery 124 connected to a low-voltage (LV) battery 128 (e.g., 12V battery) by way of a DC/DC converter 126. The HV battery 124 is configured to power and be charged by the electric machine 112. The HV battery 124 powers the electric machine 112 when the electric machine 112 applies a positive load (e.g., positive torque $T_2$) and is charged by the electric machine 112 when the electric machine 112 applies a negative load (e.g., negative torque $T_2$). The HV battery 124 is also configured to recharge the LV battery 128. The DC/DC converter 126 converts the output of the HV battery 124 into an input to charge the LV battery 128. Typically, the LV battery 128 provides electrical power for low-voltage vehicle sub-systems 129 such as lights, radio, and the like.

The control system 116 is now described in further detail. The control system 116 includes a control unit 130 that is configured to control the throttle 122, the spark timing, and the electric machine 112.

In some embodiments, the control system 116 is connected to the mechanical accessories 114, such as in cases in which it is needed to activate an AC compressor clutch or some other actuator.

It will be appreciated that the control unit 130 may in practice communicate with various other automotive systems, and that the system shown in FIG. 1 is simplified for clarity. Furthermore, while the systems shown in the drawings are incorporated into an automotive vehicle, the system is not so limited, and may be incorporated into an aircraft, a marine vessel, or any other application in which an internal combustion engine may be used.

The control unit 130 includes a processor 140, a computer-readable medium (e.g., memory 142), and program modules represented by program module 144. The program module 144 includes computer-executable instructions that are stored in the memory 142 and, when executed by the processor 140, cause the control unit 130 to perform methods described herein.

While the methods described herein may, at times, be described in a general context of computer-executable instructions, the methods of the present disclosure can also be implemented in combination with other program modules and/or as a combination of hardware and software. The term program module, or variants thereof, is used expansively herein to include routines, applications, programs, components, data structures, algorithms, and the like. Program modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer-readable media includes, for example, volatile media, non-volatile media, removable media, and non-removable media. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

In one contemplated embodiment, the control system 116 further includes a virtual torque sensor 150 determining net torque $T_4$ from the crankshaft 120. Though a feedback loop 152 is shown connecting the virtual torque sensor 150 to the control system 116, for providing the net torque $T_4$ to the control system 116, the virtual torque sensor 150 may be a component of the control system 116. The virtual torque sensor 150 uses various engine and driveline measurements to determine the net torque $T_4$.

In a primary embodiment, the control system 116 includes an RPM sensor (not shown) that is configured to measure the speed of the crankshaft 120.

In one contemplated embodiment, the control system 116 further includes a virtual state-of-charge sensor 160 determining the state of charge of the (HV) battery 124 and providing it to the control unit 130. By virtual sensor is meant a computing module that estimates state-of-charge. The virtual sensor 160 estimates the state-of-charge using measured variables, such as battery voltage, current, and temperature and mathematical models (i.e., battery mathematical models).

The program module 144 includes computer executable instructions that, when executed by the processor 140, cause the control unit 130 to control the engine 110 and the electric machine 112 and thereby control engine torque $T_1$ and torque $T_2$. In general, during idle operation, engine torque $T_1$ and torque $T_2$ are controlled to stabilize net torque $T_4$.

Figure 2:
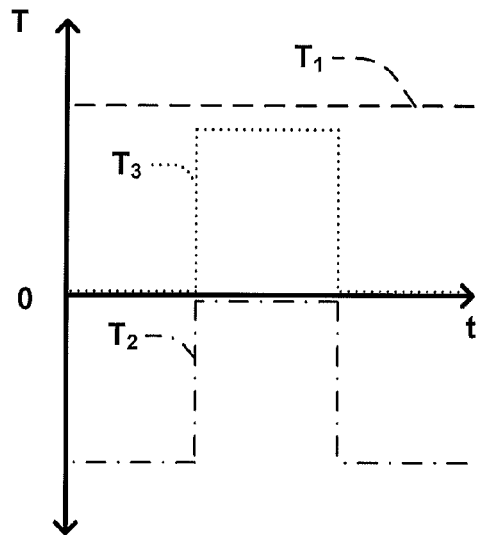
FIGS. 2 and 3 are graphical illustrations of torques associated with a charge mode of operation of the system of FIG. 1.
Figure 3:
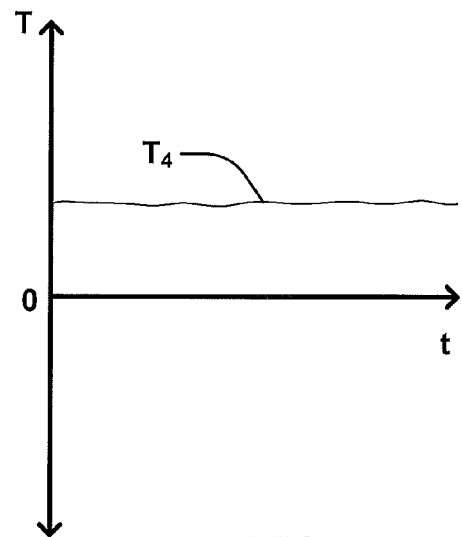
Figure 4:
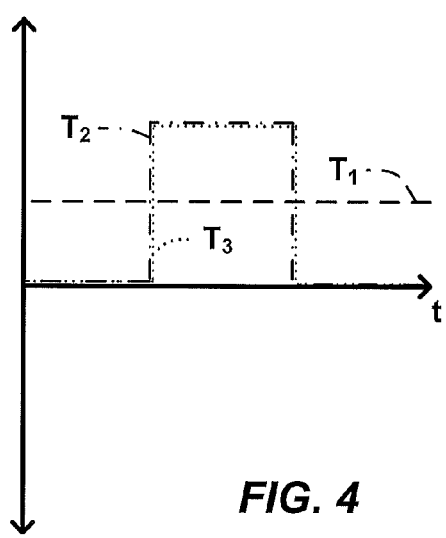
FIGS. 4 and 5 are graphical illustrations of torques associated with a discharge mode of operation of the system of FIG. 1.
Figure 5:
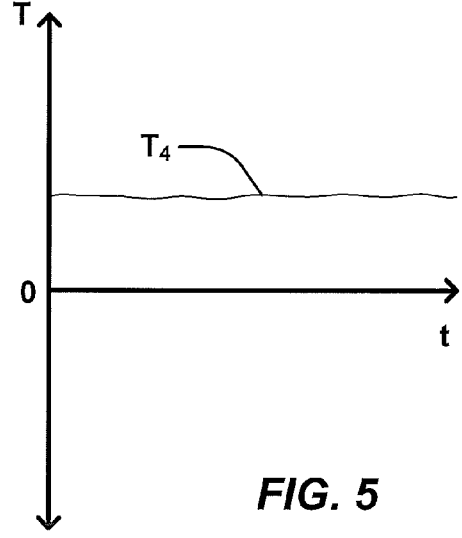

Referring to FIGS. 2-5, the control system 116 operates in one of two modes, referred to as a "charge mode" and a "discharge mode," to stabilize the net torque $T_4$. FIGS. 2 and 3 represent the charge mode and FIGS. 4 and 5 represent the discharge mode. The net torques $T_4$ shown in FIGS. 3 and 5 are substantially the same. FIG. 3 shows net torque $T_4$, being the sum of the torques $T_1$, $T_2$, $T_3$ of FIG. 2, and FIG. 5 is net torque $T_4$ that represents the sum of torques $T_1$, $T_2$, $T_3$ of FIG. 4.

Referring to FIGS. 2 and 3, in the charge mode, the control system 116 controls the electric machine 112 to apply a negative torque $T_2$, and therein charge the HV battery 124. The control system 116 increases or decreases the torque $T_2$ as needed to respond to an accessory torque $T_3$, with an increase being shown in FIGS. 2 and 4.

Regarding increasing torque $T_2$, in some cases the control system 116 reduces the absolute magnitude of a negative (or resistance) torque, as shown in FIG. 2. In other words, the numerical value of the torque is increased toward zero, though the increased torque may not actually reach zero, as the magnitude of charging torque only need be sufficiently reduced to compensate for intermittent accessory loads.

Further, in the charge mode, the control system 116 operates the engine 110 at a higher engine torque $T_1$ to compensate for the negative torque $T_2$.

Referring to FIGS. 4 and 5, in the discharge mode, the control system 116 operates the electric machine 112 to apply second torque $T_2$ of about zero in order to minimize the engine torque $T_1$ required to obtain a target net torque $T_4$. And, as provided, the control system 116 increases the torque $T_2$ as needed to respond to accessory torque $T_3$, as shown in FIG. 4.

The memory 142 stores parameters that are used to determine non-interrupted values for the engine torque $T_1$ and the torque $T_2$. The parameters include a target value for net torque $T_4$ and a maximum value for accessory torque $T_3$. The target value for net torque $T_4$ is determined so as to be large enough to overcome engine internal losses, such as mechanical friction, at idle.

Figure 6:
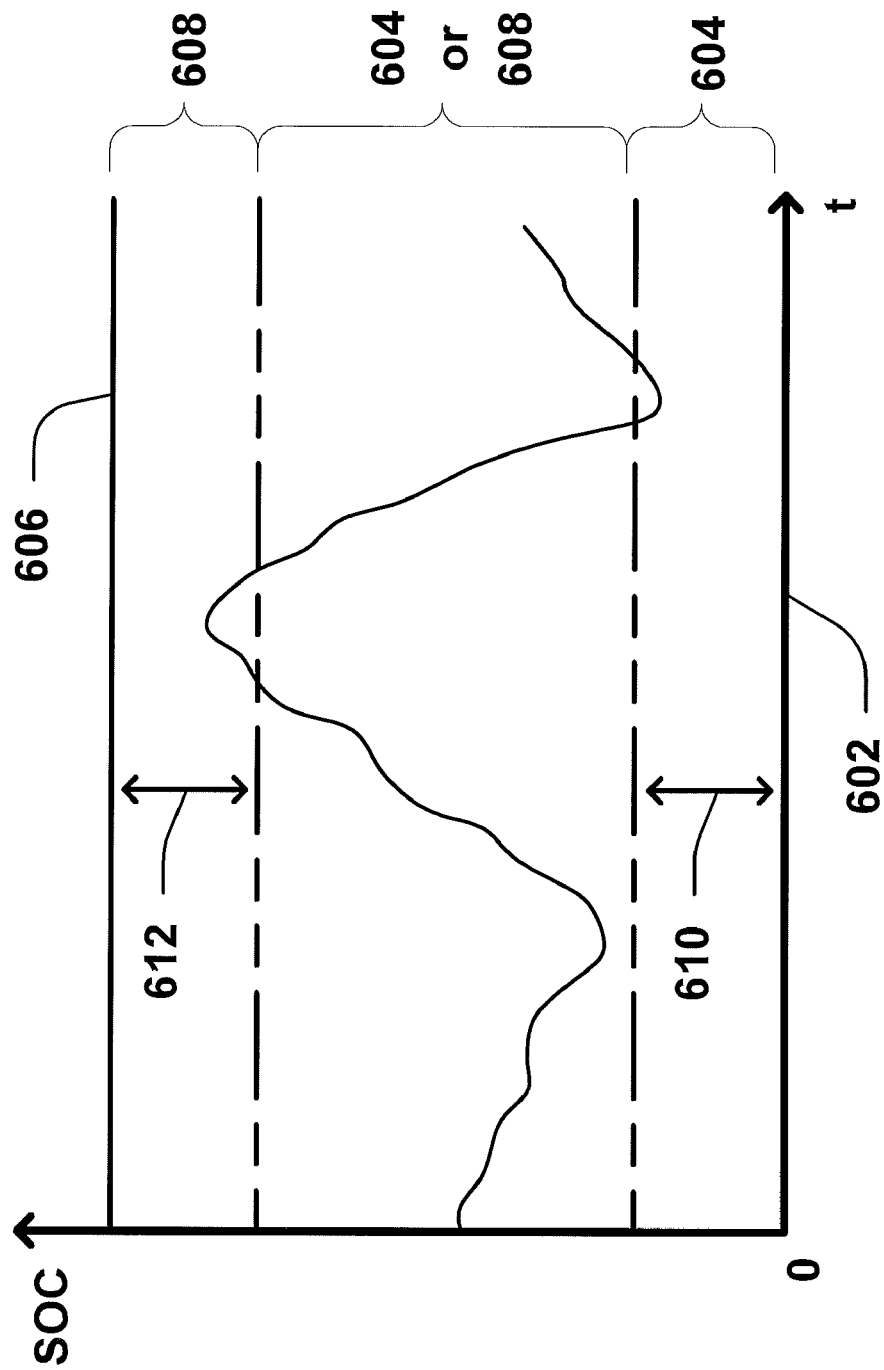
FIG. 6 is a graphical illustration of state of charge associated with a sub-system of FIG. 1.

Referring to FIG. 6, in one embodiment, according to the computer-readable instructions of the program module 144, the control unit 130 chooses a mode of operation as a function of, for example, the state of charge (SOC) of the HV battery 124. As previously provided, the vehicle 100 includes a virtual state-of-charge sensor 160 providing a state-of-charge to the control unit 130.

If the state of charge is less than a minimum state of charge 602, the control unit 130 operates in charge mode 604. Although the minimum state of charge 602 is shown being generally at a level of zero state of charge in FIG. 6, the minimum state of charge 602 is not necessarily zero. If the state of charge is greater than a maximum state of charge 606, the control unit 130 operates in discharge mode 608. As such, the HV battery 124 remains at least partially charged, and is not charged when it is full. In other contemplated embodiments, the control unit 130, executing the instructions, chooses the mode of operation as a function of other variables, such that the mode is most energy efficient for the vehicle 100.

In some embodiments, a minimum state of charge threshold, or lower threshold 610, shown in FIG. 6, is set according to one or more factors, such as a determined minimum amount of charge needed to enable application of maximum accessory load (e.g., accessory electrical load). And in some embodiments, a maximum state of charge threshold, or upper threshold 612, also shown in FIG. 6, is set according to one or more factors, such as a determined optimal state of charge.

Having one or both of these two thresholds 610, 612, which are shown in FIG. 6, places a safety band providing sufficient buffer before physical limits of the HV battery, 602, and/or 606 are reached. In cases in which these threshold bands are used, the bands could vary, such as depending on the total battery capacity. For instance, a larger battery capacity could correlate with a smaller SOC safety band.

It should be appreciated that electrical charging energy in hybrid electric vehicles (HEVs) comes entirely or at least partially from onboard fuel energy. Thus, when operating between the thresholds 610, 612 (shown in FIG. 6 as "604 or 608"), and making the decision to operate in the charge or discharge mode, it would generally be effective to charge the battery, in the charge mode, while the vehicle is at idle, when the battery can be charged with sufficiently high fuel-to-electricity system conversion efficiency and otherwise discharge the battery, in the discharge mode. For example, a relatively high torque, e.g., torque $T_1$ in FIG. 2, consumes fuel at a relatively high rate $m_{1\_HIGH}$, and a relatively low torque, e.g., $T_1$ in FIG. 4, consumes fuel at a relatively low rate $m_{1\_LOW}$.

By way of example, with $T_{2\_CHG}$ representing an electric motor charging torque, $w_2$ representing an electric motor speed, $eff_2$ representing an electric motor energy conversion efficiency (or charging efficiency), and $Q_{LHV}$ representing a lower heating value of fuel, the following relationship can be used to describe the efficiency of converting additional fuel to electricity at the electric generator output, between the relatively low rate of fuel consumption $m_{1\_LOW}$ and the relatively high rate of fuel consumption $m_{1\_HIGH}$:

$$P_{batt\_in}/P_{fuel} = (T_{2\_CHG} \times w_2 \times eff_2)/((m_{1\_HIGH} - m_{1\_LOW}) \times Q_{LHV})$$

The processor 140, implementing the instructions stored in the memory 142, compares this efficiency ($P_{batt\_in}/P_{fuel}$) to a pre-determined energy conversion efficiency value. The energy conversion efficiency value is pre-calculated by the processor 140 and stored in the memory 142 or, in a contemplated embodiment, external to the vehicle and stored in the memory 142 in an initial or updating data upload, such as during vehicle manufacture or maintenance. The pre-determined energy conversion efficiency value is set so that when the evaluated efficiency ($P_{batt\_in}/P_{fuel}$) exceeds the pre-determined efficiency during idle vehicle operation, it would be best to charge the battery. Likewise, when the evaluated efficiency ($P_{batt\_in}/P_{fuel}$) does not exceed the pre-determined efficiency during idle vehicle operation, it would be best to discharge the battery, and the system may identify a more efficient charging opportunity later during the driving cycle. In one embodiment, the pre-determined energy conversion efficiency value is a peak energy conversion efficiency possible for the system. By way of a single non-limiting example, in one implementation, peak energy conversion is about 35% peak engine efficiency and about 85% generator efficiency.

One goal of the present technology is to rapidly counteract torque disturbances on the engine shaft while maintaining a high-energy conversion efficiency (e.g., fuel and electricity combined). Presence of the HV system and the DC/DC converter makes it possible to partially isolate the LV bus from potential voltage fluctuations occurring on the HV bus.

The above-described embodiments are merely exemplary illustrations of implementations that are set forth for a clear understanding of the principles of the invention. Variations, modifications, and combinations associated with the above-described embodiments may be made without departing from the scope of the claims. All such variations, modifications, and combinations are included herein by the scope of this disclosure and the following claims.

What is claimed is:

1. A vehicular system comprising:
    an electrical subsystem including a high-voltage battery, a low-voltage battery, a direct-current/direct-current converter, and electrical accessories;
    a crankshaft;
    an internal combustion engine connected to the crankshaft, and generating a first, engine torque $T_1$ to drive the crankshaft;
    an electric machine coupled to the crankshaft, and applying a second torque $T_2$ to the crankshaft;
    a mechanical accessory sub-system, including at least one mechanical accessory, coupled to the crankshaft, and applying a third, accessory torque $T_3$ to the crankshaft;
    a control sub-system including:
        a processor; and
        a tangible, non-transitory computer-readable medium, storing instructions that, when executed by the processor, cause the processor to:
            during idle operation of the vehicle, select a mode of operation, of a plurality of system modes including a charge mode and a discharge mode, to stabilize a net torque $T_4$ being a sum of the first, second, and third torques ($T_4 = T_1 + T_2 + T_3$); and
            control operation of at least one of the electric machine and the engine according to the selected mode.

2. The vehicular system of claim 1, wherein the instructions, in causing the processor to select the mode of operation of the plurality of system modes, causes the processor to:
    evaluate vehicle parameters including an electric motor charging torque $T_{2\_CHG}$, an electric motor speed $w_2$, an electric-motor energy-conversion efficiency $eff_2$, and a lower-heating value of fuel $Q_{LHV}$, according to an algorithm relating to an efficiency of converting additional fuel to electricity at an electric generator output between a relatively-low rate of fuel consumption $m_{1\_LOW}$ and a relatively high-rate of fuel consumption $m_{1\_HIGH}$, the algorithm being represented as:

$$P_{batt\_in}/P_{fuel} = (T_{2\_CHG} \times w_2 \times eff_2)/((m_{1\_HIGH} - m_{1\_LOW}) \times Q_{LHV});$$

select the charge mode if the fuel conversion efficiency exceeds a pre-determined energy conversion efficiency value; and
    select the discharge mode if the fuel conversion efficiency does not exceed the pre-determined energy conversion efficiency value.

3. The vehicular system of claim 2, wherein the pre-determined energy conversion efficiency value is a peak energy conversion efficiency possible for the system.

4. The vehicular system of claim 1, wherein:
    the system further comprises a high-voltage (HV) battery; and
    the instructions cause the processor to:
        in selecting the mode of operation, consider a state-of-charge (SOC) of the HV battery; and in causing the processor to select the mode of operation:
  select the charge mode if the SOC is less than a minimum SOC stored in the tangible, non-transitory computer-readable medium; and
  select the discharge mode if the SOC is greater than a maximum SOC stored in the tangible, non-transitory computer-readable medium.

5. The vehicular system of claim 1, wherein:
the system further comprises a high-voltage (HV) battery; and
the instructions cause the processor to:
  in selecting the mode of operation, consider a state-of-charge of the HV battery; and
  in causing the processor to select the mode of operation, causes the processor to:
    determine a minimum SOC threshold;
    determine a maximum SOC threshold;
    select the discharge mode if the SOC is within the maximum SOC threshold; and
    select the charge mode if the SOC is within the minimum SOC threshold.

6. The vehicular system of claim 5, wherein the instructions cause the processor to:
  determine the maximum SOC threshold according to at least one factor including an optimal SOC for the HV battery;
  determine the minimum SOC (SoC) threshold to include a buffer region of charge-mode operation between a minimum SOC stored in the computer-readable medium and a minimum limit associated with the HV battery and stored in the computer-readable medium; and
  determine the maximum SoC threshold to include a buffer region of discharge-mode operation between a maximum SOC stored in the computer-readable medium and a maximum limit associated with the HV battery and stored in the computer-readable medium.

7. The vehicular system of claim 1, wherein the instructions, in causing the processor to control at least one of the electric machine and the engine according to the selected mode, cause the processor to operate the electric machine to increase or decrease the second torque $T_2$ to compensate for the third, accessory torque $T_3$.

8. The vehicular system of claim 1, wherein the instructions, in causing the processor to control at least one of the engine and the electric machine according to the selected mode, cause the processor to:
  operate the electric machine so that the second torque $T_2$ is positive or about zero when the discharge mode is selected; and
  operate the electric machine so that the second torque $T_2$ is negative or about zero when the charge mode is selected.

9. The vehicular system of claim 8, wherein the instructions cause the processor to, in controlling at least one of the engine and the electric machine according to the selected mode, control the engine to increase engine torque $T_1$ in response to controlling the electric engine to apply the negative second torque $T_2$.

10. A method implemented by a computerized system of a vehicle having an electrical sub-system, a crankshaft, an internal combustion engine connected to the crankshaft, and generating a first, engine torque $T_1$ to drive the crankshaft, an electric machine coupled to the crankshaft, and applying a second torque $T_2$ to the crankshaft, and a mechanical accessory sub-system coupled to the crankshaft, and applying a third, accessory torque $T_3$ to the crankshaft, the method comprising:
  during idle operation of the vehicle, selecting a mode of operation, of a plurality of system modes including a charge mode and a discharge mode, to stabilize a net torque $T_4$ being a sum of the first, second, and third torques ($T_4=T_1+T_2+T_3$); and
  controlling operation of at least one of the electric machine and the engine according to the selected mode.

11. The method of claim 10, wherein selecting the mode of operation of the plurality of system modes including the charge mode and the discharge mode during idle operation of the vehicle includes:
  evaluating vehicle parameters including an electric motor charging torque $T_{2\_CHG}$, an electric motor speed $w_2$, an electric-motor energy-conversion efficiency $eff_2$, and a lower-heating value of fuel $Q_{LHV}$, according to an algorithm relating to an efficiency of converting additional fuel to electricity at an electric generator output between a relatively-low rate of fuel consumption $m_{1\_LOW}$ and a relatively high-rate of fuel consumption $m_{1\_HIGH}$, the algorithm being represented as:

$$P_{batt\_in}/P_{fuel}=(T_{2\_CHG} \times w_2 \times eff_2)/((m_{1\_HIGH}-m_{1\_LOW}) \times Q_{LHV});$$

selecting the charge mode if the fuel conversion efficiency exceeds a pre-determined energy conversion efficiency value; and
  selecting the discharge mode if the fuel conversion efficiency does not exceed the pre-determined energy conversion efficiency value.

12. The method of claim 11 wherein the pre-determined energy conversion efficiency value is a peak energy conversion efficiency possible for the system.

13. The method of claim 10, wherein the vehicle further includes a high-voltage (HV) battery and the method also comprises, in selecting the mode of operation, considering a state-of-charge of the HV battery.

14. The method of claim 13, wherein selecting the mode of operation includes:
  selecting the charge mode if the SOC is less than a minimum SOC stored in the tangible, non-transitory computer-readable medium; and
  selecting the discharge mode if the SOC is greater than a maximum SOC stored in the tangible, non-transitory computer-readable medium.

15. The method of claim 13, further including determining a maximum SOC threshold according to at least one factor includes determining an optimal SOC for the HV battery.

16. The method of claim 15, wherein:
  determining a minimum SOC threshold;
  determining a maximum SOC threshold;
  selecting the discharge mode if the SOC is within the maximum SOC threshold; and
  selecting the charge mode if the SOC is within the minimum SOC threshold;
  determining the minimum SOC (SoC) threshold includes determining the minimum SoC threshold to define a buffer region of charge-mode operation between a minimum SOC stored in the computer-readable medium and a minimum limit associated with the HV battery and stored in the computer-readable medium; and
  determining the maximum SoC threshold includes determining the maximum SoC threshold to define a buffer region of discharge-mode operation between a maximum SOC stored in the computer-readable medium and a maximum limit associated with the HV battery and stored in the computer-readable medium.

17. The method of claim 10, wherein controlling at least one of the engine and the electric machine according to the selected mode includes:
- operating the electric machine so that the second torque $T_2$ is positive or about zero when the discharge mode is selected;
- operating the electric machine so that the second torque $T_2$ is negative or about zero when the charge mode is selected; and
- controlling the engine to increase engine torque $T_1$ in response to controlling the electric engine to apply the negative second torque $T_2$.

18. A tangible, non-transitory computer-readable medium storing instructions that, when executed by a computer processor, cause the processor to perform a method for controlling select operations of a vehicle having an electrical sub-system, a crankshaft, an internal combustion engine connected to the crankshaft, and generating a first, engine torque $T_1$ to drive the crankshaft, an electric machine coupled to the crankshaft, and applying a second torque $T_2$ to the crankshaft, and a mechanical accessory sub-system coupled to the crankshaft, and applying a third, accessory torque $T_3$ to the crankshaft, the method comprising:
- during idle operation of the vehicle, selecting a mode of operation, of a plurality of system modes including a charge mode and a discharge mode, to stabilize a net torque $T_4$ being a sum of the first, second, and third torques ($T_4=T_1+T_2+T_3$); and
- controlling operation of at least one of the electric machine and the engine according to the selected mode.

19. The tangible, non-transitory computer-readable medium of claim 18, wherein the instructions stored thereon cause the processor to perform the method further comprising, in selecting the mode of operation of the plurality of system modes including the charge mode and the discharge mode during idle operation of a vehicle:
- evaluating vehicle parameters including an electric motor charging torque $T_{2\_CHG}$, an electric motor speed $w_2$, an electric-motor energy-conversion efficiency $eff_2$, and a lower-heating value of fuel $Q_{LHV}$, according to an algorithm relating to an efficiency of converting additional fuel to electricity at an electric generator output between a relatively-low rate of fuel consumption $m_{1\_LOW}$ and a relatively high-rate of fuel consumption $m_{1\_HIGH}$, the algorithm being represented as:

$$P_{batt\_in}/P_{fuel} = (T_{2\_CHG} \times w_2 \times eff_2)/((m_{1\_HIGH} - m_{1\_LOW}) \times Q_{LHV});$$

- selecting the charge mode if the fuel conversion efficiency exceeds a pre-determined energy conversion efficiency value; and
- selecting the discharge mode if the fuel conversion efficiency does not exceed the pre-determined energy conversion efficiency value;
- wherein the pre-determined energy conversion efficiency value is a peak energy conversion efficiency possible for the system.

20. The tangible, non-transitory computer-readable medium of claim 18, wherein the instructions stored thereon cause the processor to, in selecting the mode of operation, considering a state-of-charge of a HV battery of the vehicle.

* * * * *